(12) United States Patent
Ohno et al.

(10) Patent No.: US 6,990,269 B2
(45) Date of Patent: Jan. 24, 2006

(54) FIBER OPTIC GYROSCOPE

(75) Inventors: Aritaka Ohno, Tokyo (JP); Ryuji Usui, Kanagawa (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 116 days.

(21) Appl. No.: 10/700,312

(22) Filed: Oct. 31, 2003

(65) Prior Publication Data

US 2004/0091207 A1 May 13, 2004

(30) Foreign Application Priority Data

Nov. 1, 2002 (JP) ......................... 2002-319872

(51) Int. Cl.
  *G02B 6/00* (2006.01)
  *G02B 6/36* (2006.01)

(52) U.S. Cl. .......................... 385/27; 356/483
(58) Field of Classification Search ............ 385/11–16, 385/24, 27; 356/483, 477, 345, 350; 250/227.19, 250/227.11

See application file for complete search history.

(56) References Cited

U.S. PATENT DOCUMENTS

| 5,187,757 | A | | 2/1993 | Ohno et al. |
| 5,327,213 | A | * | 7/1994 | Blake et al. ................ 356/460 |
| 5,381,230 | A | | 1/1995 | Blake et al. |
| 5,475,772 | A | | 12/1995 | Hung et al. |
| 2003/0123064 | A1 | * | 7/2003 | Szafraniec et al. ......... 356/460 |
| 2003/0180012 | A1 | * | 9/2003 | Deane et al. ................ 385/92 |
| 2004/0027816 | A1 | * | 2/2004 | Ice ............................ 361/797 |

FOREIGN PATENT DOCUMENTS

| EP | 0260885 | 3/1988 |
| EP | 0279602 | 8/1988 |
| EP | 0760461 | 3/1997 |
| JP | H666572 | 3/1994 |
| JP | 6-307876 | 11/1994 |
| JP | 8029184 | 2/1996 |
| JP | 2514530 | 4/1996 |
| JP | 7-151555 | 6/1996 |
| JP | 2552603 | 8/1996 |
| JP | 2737030 | 1/1998 |
| JP | 2002-532705 | 2/2002 |
| WO | WO/00/36375 | 6/2000 |

OTHER PUBLICATIONS

Ohno, A., et al., "Intermediate and moderate grade Fiber Optic Gyroscope for industrial applications," Proceedings of SPIE, vol. 2292, Fiber Optic and Laser Sensors XII (1994) pp. 166–176.

Usui, et al., "Intermediate Grade FOG with Single Mode Fiber Coil" SPIEvol. 2070 Fiber Optic and Laser Sensors XI (1993).

* cited by examiner

*Primary Examiner*—Akm Enayet Ullah
(74) *Attorney, Agent, or Firm*—David N. Lathrop, Esq.; Gallagher & Lathrop

(57) ABSTRACT

In a fiber optic gyroscope comprising a light source, a fiber optic coupler, an optical integrated circuit having a function of a polarizer and a branching optical waveguide, and a fiber optic coil, and detecting an angular velocity applied to the fiber optic coil about the axis thereof, a polarization maintaining optical fiber having its length L is connected to an input/output end of the optical integrated circuit nearer the light source in an optical system of optical fiber from the light source to the optical integrated circuit, the polarization maintaining optical fiber of its length L resulting in a difference in group delay time between the orthogonal two polarization modes and the difference at least exceeding a coherence length of light from the light source. An optical system of optical fiber from the light source to the optical integrated circuit except for the polarization maintaining optical fiber of its length L is formed by a single mode optical fiber, and the fiber optic coupler is formed by a single mode optical fiber.

4 Claims, 6 Drawing Sheets

TEMPERATURE TEST IN CASE OPTICAL PATH FROM LIGHT SOURCE TO OPTICAL INTEGRATED CIRCUIT IS FORMED BY SINGLE MODE OPTICAL FIBER

TEMPERATURE TEST IN CASE ALL OF OPTICAL PATH FROM LIGHT SOURCE TO OPTICAL INTEGRATED CIRCUIT IS FORMED BY POLARIZATION MAINTAINING OPTICAL FIBER

TEMPERATURE TEST IN CASE A PORTION OF OPTICAL PATH FROM LIGHT SOURCE TO OPTICAL INTEGRATED CIRCUIT IS FORMED BY POLARIZATION MAINTAINING OPTICAL FIBER OF INSUFFICIENT SHORT LENGTH

FIBER OPTIC GYROSCOPE

BACKGROUND OF THE INVENTION

1. Field of the Invention

The present invention relates to an improvement in a fiber optic gyroscope (FGO) that detects a rotation to an inertial space.

2. Description of the Related Art

A typical of a substrate-type optical integrated circuit that is used in a fiber optic gyroscope (hereinafter, referred to simply as gyro) is a Y-branching or Y-propagating optical waveguide that is fabricated on an optical crystal substrate of Lithium Niobate (LiNbO$_3$) using proton exchange method. Though two propagation modes, namely, a TE mode (Transverse Electric mode) and a TM mode (Transverse Magnetic mode) are produced in a normal optical waveguide, this optical waveguide fabricated using the proton exchange method has its inherent nature that only the TE mode is formed as a guide mode or propagation mode and the TM mode is not formed as a guide mode or propagation mode. In other words, the optical waveguide itself, fabricated on the optical crystal substrate of Lithium Niobate using the proton exchange method, is provided with a function of a polarizer having very high extinction ratio. As a result, when light from a light source is incident on the proton exchanged optical waveguide, only light wave of the TE mode is propagated, whereas light wave of the TM mode will not be propagated and will be extinguished. The above-mentioned technology is described in, for example, Japanese Patent No. 2552603 (Japanese Patent Application Public Disclosure No. 05-196471) and Japanese Patent Application Public Disclosure No. 08-029184, Japanese Patent No. 2737030 (International Publication No. WO 95/34010 corresponding to U.S. Pat. No. 5,475,772), or Proceedings of SPIE, Vol. 2292, pp. 166–176.

In the substrate-type optical integrated circuit having the function of a polarizer there may happen a phenomenon that notwithstanding a component of polarization to be extinguished, namely, light wave of the TM mode has been really leaked without coupling to light wave of the TE mode, the TM mode light wave is reflected, for example, from a bottom of the optical integrated circuit substrate so that conversion of the polarization state (mode conversion) occurs and a portion thereof is coupled to the propagation mode, or the like. Such irregular re-coupling of the extinction mode to the propagation mode apparently results in a phenomenon that extinction ratio of the polarizer is insufficient which causes an error in a detected output (angular velocity) of a fiber optic gyro, that is, a bias (degree/hour) in a detected output of a fiber optic gyro. In other words, in spite that an optical waveguide fabricated using proton exchange method should intrinsically have very high extinction ratio, there may appear a bias due to shortage of extinction.

Since such bias periodically varies in its magnitude depending upon a difference in phase of the leaked and coupled light to the TM mode, in a temperature test or the like of a fiber optic gyro, for example, it is observed as a periodically varying bias attendant upon a gradient of temperature. The reason is that in general, a difference occurs in coefficient of temperature variation of an optical path in an optical system such as an optical integrated circuit, optical fiber, or the like between polarization modes (TE mode and TM mode).

As to occurrence of such stray light in an optical crystal substrate on which an optical waveguide was fabricated using the proton exchange method, there is described in, for example, Japanese Patent No. 2737030 mentioned above. However, this prior art describes only a phenomenon that the extinguished light wave of the TM mode is reflected from a bottom of the optical waveguide substrate of LiNbO$_3$ or LiTaO$_3$ and a portion of the reflected light wave propagates without mode conversion and exits from the output end of the proton exchanged optical waveguide through an optical fiber connected thereto and hence it couples to the subsequent light wave of the TE mode.

On the contrary, the present invention aims at a phenomenon that stray light of a TM mode is subjected to irregular reflections or the like in an optical waveguide substrate so that it is mode-converted to a TE mode, and that the phase-delayed stray light of the TE mode propagates and exits from the output end of the optical waveguide through an optical fiber connected thereto, that is, the phase-delayed stray light couples to the main propagation mode (TE mode) and it interferes with the subsequent light wave of the main mode, which results in an error in a detected output of a fiber optic gyro. An object of the present invention is to suppress the influence of re-coupling of the stray light, particularly a component thereof that has been mode-converted, in the proton exchanged optical waveguide.

FIG. 1 shows a construction of a prior art closed loop type fiber optic gyro. Light emitted from a light source 10 propagates and is incident on an optical integrated circuit 14 through a first optical fiber 11, a fiber optic coupler 12 and a second optical fiber 13 in series. The first optical fiber 11 is used to couple between the light source 10 and the fiber optic coupler 12 and is formed by a polarization maintaining optical fiber in this example. The second optical fiber 13 is used to couple between the fiber optic coupler 12 and the optical integrated circuit 14 and is formed by a polarization maintaining optical fiber in this example. In this example, the fiber optic coupler 12 is fabricated by two polarization maintaining optical fibers, and the optical integrated circuit 14 is provided with a Y-branching optical waveguide 15 that is fabricated on an optical crystal substrate of Lithium Niobate (LiNbO$_3$) using the proton exchange method and two optical or light modulators 16 and 17.

Light entered into the Y-branching optical waveguide 15 is branched into two light waves, namely, a first light wave and a second light wave, and the first light wave propagates and is incident on an fiber optic coil 20 through a third optical fiber 18 to propagate through the fiber optic coil 20 in the clockwise direction (hereinafter, referred to as CW direction). The second branched light wave propagetes and is incident on the fiber optic coil 20 through a fourth optical fiber 21 to propagate through the fiber optic coil 20 in the counterclockwise direction (hereinafter, referred to as CCW direction). In this example, the third and fourth optical fibers 18 and 21 are formed by polarization maintaining optical fibers, respectively. The inherent axes of these polarization maintaining optical fibers 18 and 21 are spliced to the output ends of the Y-branching optical waveguide 15 in the axis rotation method with each polarization maintaining optical fiber having its inherent axes placed at an angle of 45 degrees. As a result, both of the polarization maintaining optical fibers 18 and 21 function as depolarizers, respectively. The fiber optic coil 20 is formed by a single mode optical fiber.

A phase difference is produced between the light wave propagating through the fiber optic coil 20 in the CW direction and the light wave propagating through the fiber optic coil 20 in the CCW direction as the fiber optic coil 20 rotates. These light waves are entered into the Y-branching optical waveguide 15 and are coupled to each other so that an interference light is produced. The interference light is entered into the fiber optic coupler 12 and sent to a photodetector 25 which, in turn, outputs an electric signal corresponding to an intensity of the interference light. The electric signal outputted from the photodetector 25 is supplied to a detection circuit 26.

The optical modulators 16 and 17 are used to make the detection sensitivity of the gyro high. The first optical modulator 16 is located on one of the branched optical waveguides of the Y-branching optical waveguide 15 and the second optical modulator 17 is located on the other branched optical waveguide. To the second optical modulator 17 is supplied a phase modulation signal (for example, a sinusoidal wave) from a phase modulation circuit 27, thereby to phase-modulate the light wave propagating through the other branched optical waveguide. At the same time, the phase modulation circuit 27 supplies a synchronizing signal to the detection circuit 26 which, in turn, synchronously detects an electric signal outputted from the photodetector 25.

A detection output that is outputted from the detection circuit 26 and corresponds to an inputted angular velocity is supplied to a feedback signal generator circuit 28. The feedback signal generator circuit 28 generates a feedback signal corresponding to the magnitude of the inputted detection output and supplies it to the first optical modulator 16 to control such that the detection output from the detection circuit 26 comes to zero. An output signal of the fiber optic gyro (FOG) is obtained from the feedback signal generated from the feedback signal generator circuit 28. The construction and operation of such closed loop type fiber optic gyro are already known, and are described in, for example, the aforementioned Proceedings of SPIE, Vol. 2292, pp. 166–176. In addition, the construction and operation of an open loop type fiber optic gyro are already known, and are described in, for example, the afore-mentioned Japanese Patent Application Public Disclosure No. 08-029184. Therefore, detailed explanation thereof will be omitted here.

The reason that the optical path from the light source 10 via the fiber optic coupler 12 to the optical integrated circuit 14 is formed by a polarization maintaining optical fiber is such that the output light from the light source 10 is normally in the state of partially polarized light and if there is any fluctuation of polarization in the optical path from the light source 10 via the fiber optic coupler 12 to the Y-branching optical waveguide 15 of the optical integrated circuit 14, light wave having, correlativity between TE mode and TM mode in the Y-branching optical waveguide 15 is excited so that the TM mode becomes coherent state to the TE mode. In case of the optical waveguide of Lithium Niobate fabricated by using the proton exchange method, the TM mode comes to the leaky mode toward the outside of the optical waveguide and is extinguished. However, in case the leaky mode again couples to the optical waveguide in the optical integrated circuit substrate, if the TE mode and the TM mode are in the coherent state as mentioned above, they interfere with each other to bring about an error (drift) in the output of the fiber optic gyro. Because of such problem, it is a general procedure that the optical path from the light source 10 via the fiber optic coupler 12 to the optical integrated circuit 14 is not formed by a single mode optical fiber but is entirely formed by a polarization maintaining optical fiber.

In case the optical path from the light source 10 via the fiber optic coupler 12 to the optical integrated circuit 14 is formed by a single mode optical fiber (the fiber optic coupler 12 is also formed by single mode optical fibers), an example of the output of the fiber optic gyro is shown in FIG. 2, and in case the optical path from the light source 10 via the fiber optic coupler 12 to the optical integrated circuit 14 is entirely formed by a polarization maintaining optical fiber like the prior art shown in FIG. 1, an example of the output of the fiber optic gyro is shown in FIG. 3. Further, in both examples, a polarization maintaining optical fiber of its length 2L (length L will be described later) and a polarization maintaining optical fiber of its length 4L are inserted in the optical paths between the respective input/output ends of the Y-branching optical waveguide 15 of the optical integrated circuit 14 nearer the fiber optic coil 20 and the corresponding input/output ends of the fiber optic coil 20 formed by a single mode optical fiber, respectively.

As is clear by comparing FIGS. 2 and 3, in case all of the optical path from the light source 10 via the fiber optic coupler 12 to the input/output end nearer the light source of the Y-branching optical waveguide 15 of Lithium Niobate is formed by a polarization maintaining optical fiber having no fluctuation of polarization, it is understood that any drift (bias) is suppressed.

Incidentally, in the construction of the prior art fiber optic gyro shown in FIG. 1, as is easily understood from FIG. 3, periodical variation of the bias attendant upon a gradient of temperature is not observed so much. The reason is that all of the optical system from the light source 10 to the optical integrated circuit 14 including the fiber optic coupler is formed by a polarization maintaining optical fiber.

The polarization maintainability of the optical system is based on double refraction and in a polarization maintaining optical fiber, due to its double refraction, there is a difference in transmission rate between two orthogonal linearly polarization modes. That is, there exist a slow axis (TM mode) and a fast axis (TE mode) as a polarization axis, and in case of a light source such as a super luminescence diode (SLD) that is used in a general fiber optic gyro, as to a coherence of emitted light therefrom, if the emitted light propagates through a polarization maintaining optical fiber by a distance of several ten cm or so, a group delay between both polarization modes fully exceeds the coherence of light, and hence any coherence is already disappeared between lights of both polarization modes. Accordingly, as described above, even if a stray light to be extinguished is irregularly re-coupled in the optical integrated circuit, no bias occurs if there is no coherence between the stray light and light of the propagation mode, and also there is no periodicity depending upon temperature based on the phase relationship.

As is well known, the polarization maintaining optical fiber is expensive and especially, the fiber optic coupler fabricated by polarization maintaining optical fibers is very costly because a manufacturing process in which it is fabricated by matching the polarization axes of two optical fibers with each other is very complicated. For this reason, it comes to an obstacle to reduce the cost of production.

Recently, in a fiber optic gyro, in order to reduce the cost thereof, it has been carried out to fabricate a fiber optic coil part by use of a single mode optical fiber. This can be achieved by a technique that gives a function of depolarizer to a fiber optic coil consisting of a single mode optical fiber to maintain the polarization state of light propagating through the coil in constant and that suppress a variation of an output bias based on a variation of the polarization state. In one implementation example thereof, it is configured that to both ends of a fiber optic coil consisting of a single mode optical fiber are connected polarization maintaining optical fibers each of which has its length that results in a sufficient group delay to light propagating therethrough, respectively, and each polarization maintaining optical fiber is connected to the corresponding optical waveguide of the optical integrated circuit with their polarization axes spliced in the axis rotation method with an angle of 45 degrees between them (that is, a function of depolarizer is given to each of the polarization maintaining optical fibers), and that while light wave entering into the fiber optic coil from the corresponding optical waveguide of the optical integrated circuit propagates through the associated polarization maintaining optical fiber, polarization is depolarized. Moreover, in this implementation example, in order to prevent effects of the group delays in the polarization maintaining optical fibers connected respectively to both ends of the fiber optic coil consisting of a single mode optical fiber from being cancelled each other while light to be transmitted in the CW direction or in the CCW direction propagates through both of the polarization maintaining optical fibers, a difference is provided in their lengths of the two polarization maintaining optical fibers, this difference in length being greater than unit length of the polarization maintaining optical fiber that is required to depolarize polarization of light propagating through the polarization maintaining optical fiber of unit length. Further, in a fiber optic gyro, as to fabrication of the fiber optic coil by use of a single mode optical fiber in order to reduce the cost of the gyro, there are described in, for example, Japanese Patent Application Public Disclosure No. 06-066572, U.S. Pat. No. 5,187,757, and Japanese Paten No. 2514530 (Japanese Patent Application Public Disclosure No. 05-322590).

In order to fabricate the optical system of a fiber optic gyro inexpensively, the inventors have performed various experiments in which the optical system from the light source to the optical integrated circuit has been replaced by an inexpensive single mode optical system instead of the expensive prior art polarization maintaining optical system. In such experiments, they have confirmed that by merely replacing the polarization maintaining optical system by a single mode optical system, an output bias occurs due to re-coupling of a stray light described above, because coherence between two polarization modes is not disappeared.

SUMMARY OF THE INVENTION

It is an object of the present invention to provide a fiber optic gyro in which an optical system of the gyro is fabricated by use of a single mode optical system to the utmost, and that can be fabricated inexpensively, and that can suppress an output bias due to re-coupling of a stray light to be extinguished in an optical integrated circuit.

It is another object of the present invention to provide a fiber optic gyro in which a polarization maintaining optical fiber of a short length is connected to each of three input/output ends of a Y-branching optical waveguide of Lithium Niobate of an optical integrated circuit so that the influence of a fluctuation of polarization in an optical path formed by a single mode optical fiber from a light source to the optical integrated circuit can be suppressed and a fiber optic coil as well as a fiber optic coupler can be formed by a single mode optical fiber.

In order to accomplish the foregoing objects, in an aspect of the present invention, there is provided a fiber optic gyro in which light from a light source is entered through an optical fiber and a fiber optic coupler into a substrate type optical integrated circuit having a function of a polarizer and a branching optical waveguide, light waves branched in the optical integrated circuit are entered into both ends of a fiber optic coil as a clockwise light and a counterclockwise light respectively, the clockwise light and the counterclockwise light having propagated through the fiber optic coil are coupled to each other in the optical integrated circuit thereby to interfere both light waves with each other, the interference light is entered into a photodetector through the fiber optic coupler to convert the intensity thereof to an electric signal, and an angular velocity applied to the fiber optic coil about the axis thereof is detected from the electric signal, the fiber optic gyroscope comprising: a polarization maintaining optical fiber having its length L connected to an input/output end of the optical integrated circuit nearer the light source in an optical system of optical fiber from the light source to the optical integrated circuit, the polarization maintaining optical fiber of its length L resulting in a difference in group delay time between the orthogonal two polarization modes and the difference at least exceeding a coherence length of light from the light source; an optical system of optical fiber from the light source to the optical integrated circuit except for the polarization maintaining optical fiber of its length L, that is constructed by a single mode optical fiber; and the fiber optic coupler that is constructed by a single mode optical fiber.

In a preferred embodiment, the branching optical waveguide of the optical integrated circuit and the polarization maintaining optical fiber of its length L are connected with each other in the state that the branching optical waveguide and the polarization maintaining optical fiber of its length L are aligned with each other so that the TM mode axis of the branching optical waveguide coincides with the slow axis of the polarization maintaining optical fiber of its length L.

In addition, the fiber optic coil is constructed by a single mode optical fiber, a first and a second polarization maintaining optical fibers are connected to both ends of the coil respectively, the two polarization maintaining optical fibers are connected to the branching optical waveguide of the optical integrated circuit in the axis rotation method in the state that the polarization axis of each polarization maintaining optical fiber and the polarization axis of the corresponding branching optical waveguide are placed at an angle of 45 degrees, the first polarization maintaining optical fiber has its length at least longer than 2L, and the second polarization maintaining optical fiber has its length at least longer than 4L.

With the construction as described above, there occurs no irregular re-coupling of a stray light to be extinguished in the optical integrated circuit, and any bias does not occur. Accordingly, it is possible to make the detection sensitivity of the fiber optic gyro higher. In addition, the optical path from the light source to the optical integrated circuit as well as the fiber optic coupler consisting of a single mode optical fiber are all constructed by a single mode optical fiber except for the polarization maintaining optical fiber having its length L. As a result, the production cost can be markedly reduced down.

DETAILED DESCRIPTION OF THE PREFERRED EMBODIMENTS

Figure 1:
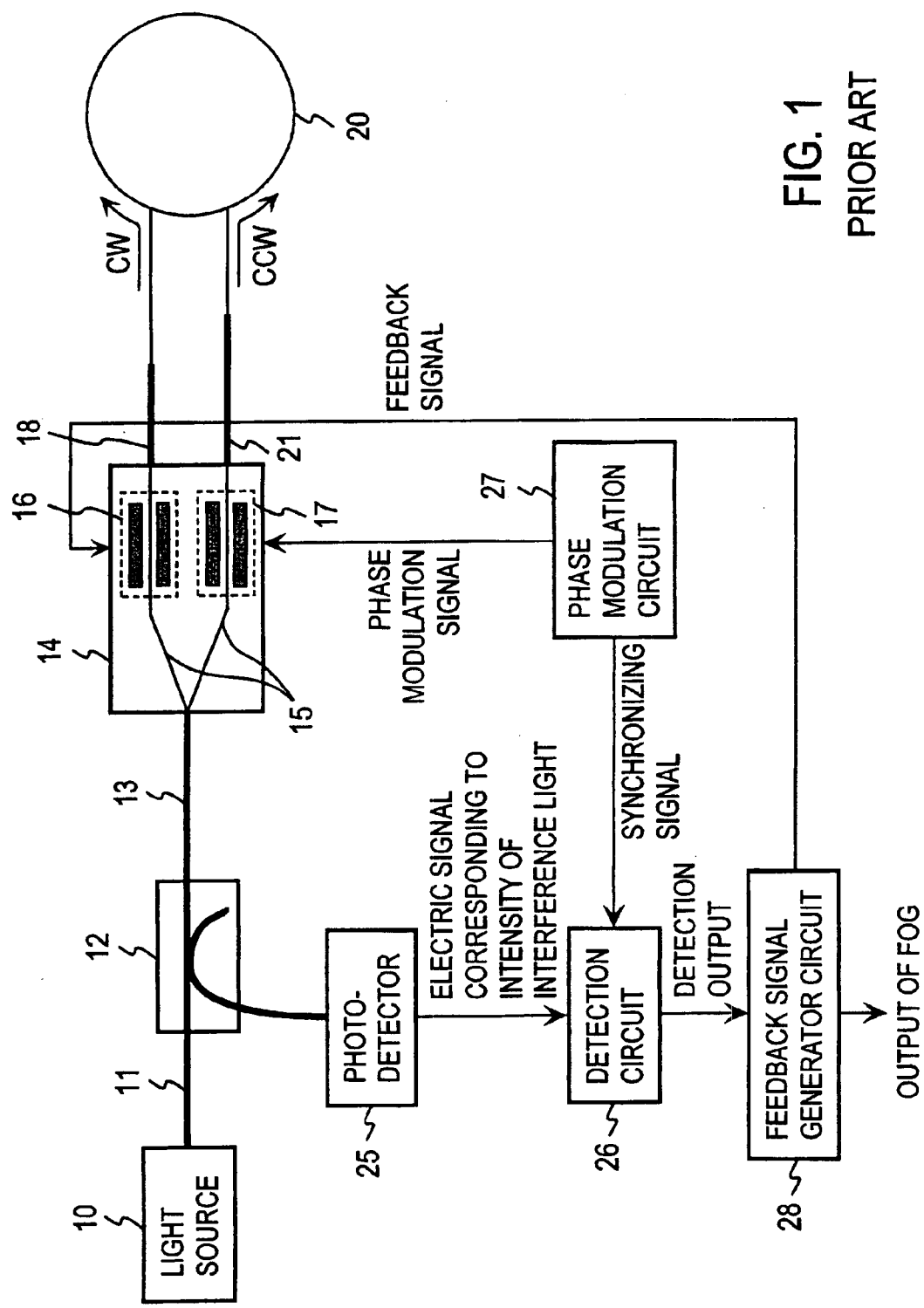
FIG. 1 is a block diagram showing an example of the construction of a prior art closed loop type fiber optic gyro.
Figure 2:
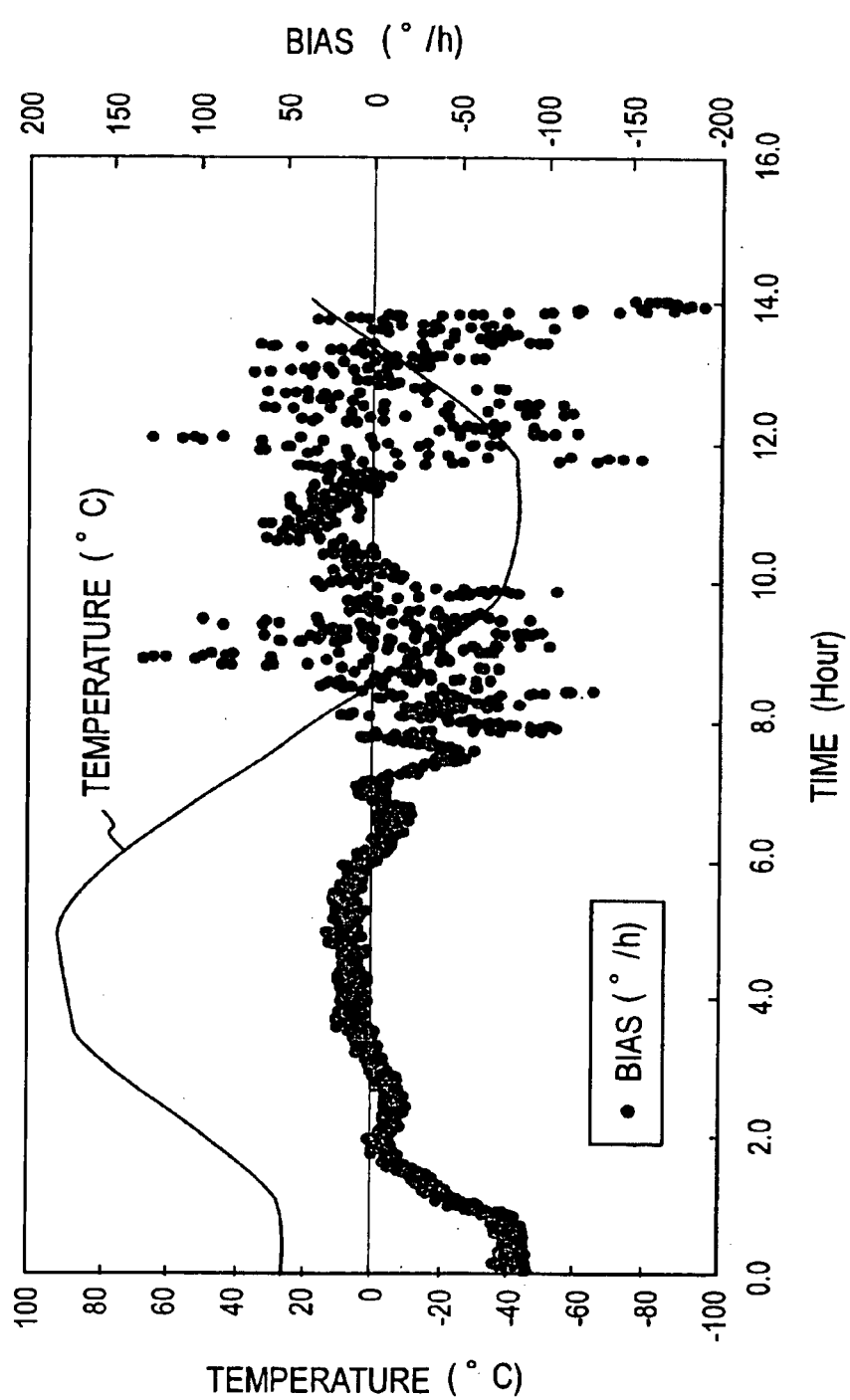
FIG. 2 is a graph showing the result of temperature test (variation of the bias to variation of temperature) for a fiber optic gyro in which an optical path from the light source to the optical integrated circuit as well as the fiber optic coupler are all formed by a single mode optical fiber.

The preferred embodiment of the present invention will now be described in detail with reference to FIGS. 4 and 5. The present invention may, however, be embodied in many different forms and should not be construed as limited to the embodiment set forth hereinafter; rather, the embodiment is provided so that this disclosure will be thorough and complete, and will fully convey the scope of the invention to those skilled in the art.

The present invention not only places a polarization maintaining optical fiber of a short length at an input/output end of an optical integrated circuit nearer a light source (specifically, an input/output end of a Y-branching proton exchanged optical waveguide nearer the light source of the optical integrated circuit) thereby to enable the remaining optical system from the light source to the input/output end of the optical integrated circuit nearer the light source to be formed by a single mode optical fiber and to enable a fiber optic coupler to be formed by a single mode optical fiber but also places a polarization maintaining optical fiber of a short length and a depolarizer in each of optical systems from two input/output ends of the optical integrated circuit nearer a fiber optic coil (specifically, input/output ends of the Y-branching proton exchanged optical waveguide nearer the fiber optic coil of the optical integrated circuit) to the fiber optic coil thereby to enable the fiber optic coil to be formed by a single mode optical fiber.

The length of the polarization maintaining optical fiber of a short length connected to the input/output end of the optical integrated circuit nearer the light source is required to set such that while light propagates through this polarization maintaining optical fiber, a group delay time given between the orthogonal components of the light becomes larger than a coherent time of the light. Likewise, each of the lengths of the two polarization maintaining optical fibers of short lengths connected respectively to the two input/output ends of the optical integrated circuit nearer the fiber optic coil is required to set such that while light propagates through each of the polarization maintaining optical fibers, a group delay time given between the orthogonal components of the light becomes larger than a coherent time of the light. In order to satisfy this condition, it is desirable that the length L of each polarization maintaining optical fiber is set to fulfill the requirement of the following equation.

$$L\lambda/B > Lc$$

Where B indicates a beat length (typical value is 2 mm), $\lambda$ indicates a wavelength of light (typical value is 0.83 $\mu$m), and Lc indicates a coherent length of light (typical value of a fiber optic gyro is 50 $\mu$m), and when these typical values are substituted in the above equation, the following equation is obtained.

$$L > 0.12 \text{ m}$$

In the above equation, L/B represents a phase difference due to a difference in transmission velocities of the orthogonal components, and L$\lambda$/B represents a distance between the wave fronts of the orthogonal components. Accordingly, the above equation means that if the distance L$\lambda$/B is greater than the coherent length. Lc, the influence of a fluctuation of polarization can be suppressed. Therefore, the polarization maintaining optical fibers each having its length that fulfills the requirement of the above equation can easily be embodied or realized.

Next, the construction of an embodiment of the fiber optic gyro according to the present invention will be described in detail with reference to FIG. 4.

Figure 4:
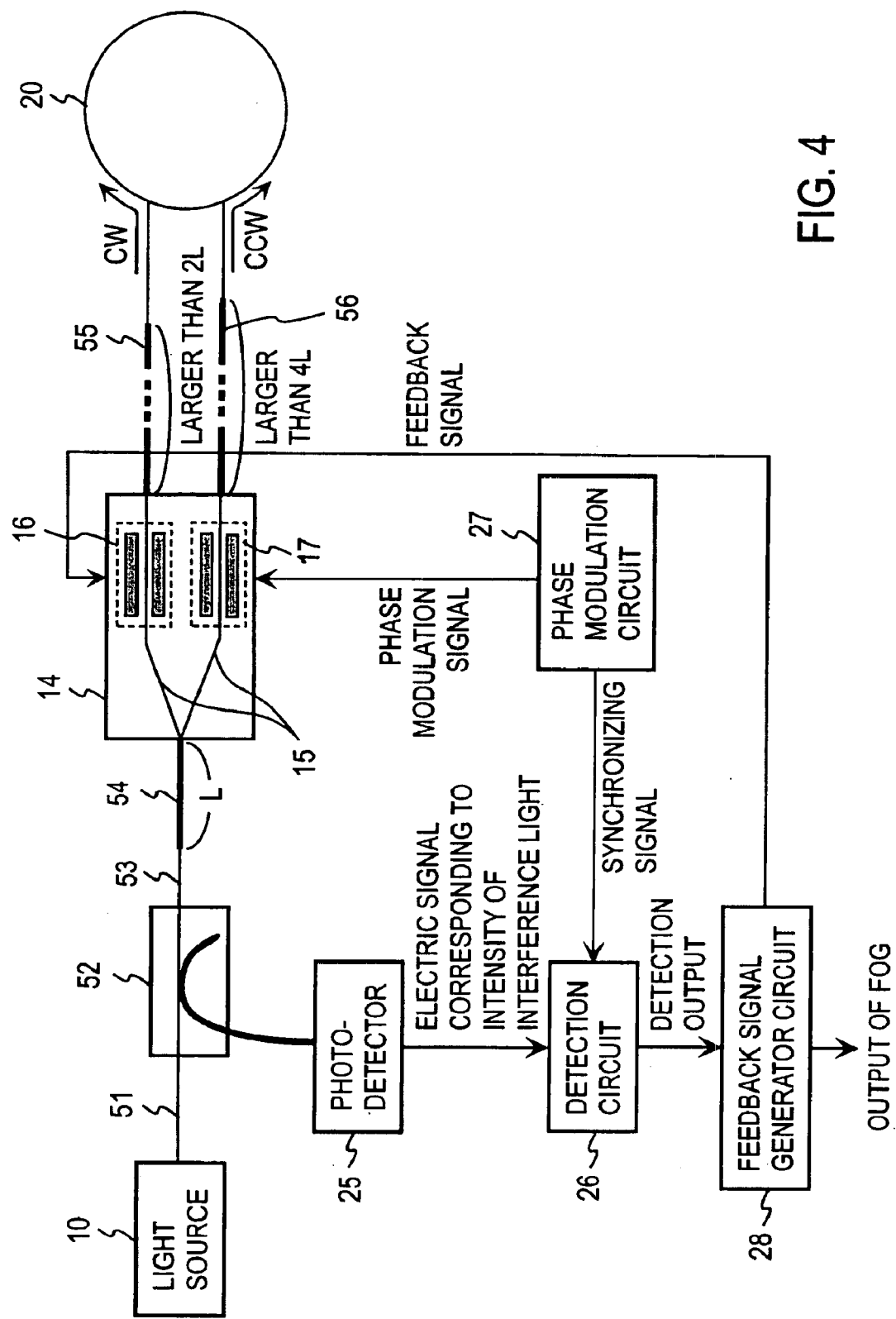
FIG. 4 is a block diagram showing the construction of an embodiment of the fiber optic gyro according to the present invention.

FIG. 4 is a block diagram showing the construction of an embodiment of the present invention in which the present invention is applied to a closed loop type fiber optic gyro. Further, in FIG. 4, elements and portions corresponding to those in FIG. 1 will be denoted by the same reference characters attached thereto, and explanation thereof will be omitted unless necessary.

Light emitted from a light source 10 propagates and is incident on an optical integrated circuit 14 via a first optical fiber 51, a fiber optic coupler 52, a second optical fiber 53 and a fourth optical fiber 54 in series. The first optical fiber 51 is used to couple between the light source 10 and the fiber optic coupler 52 and is formed by a single mode optical fiber in this embodiment. The second optical fiber 53 and the third optical fiber 54 are used to couple between the fiber optic coupler 52 and the optical integrated circuit 14, and the second optical fiber 53 is formed by a single mode optical fiber and the third optical fiber 54 is formed by a polarization maintaining optical fiber having its length L in this embodiment. Here, one unit of length of the polarization maintaining optical fiber in which a sufficient group delay occurs relative to a coherence of the light from the light source 10 is defined as L.

The fiber optic coupler 52 is fabricated, in this embodiment, by two single mode optical fibers, and like the prior art, the optical integrated circuit 14 is provided with a Y-branching optical waveguide 15 that is fabricated on an optical crystal substrate of Lithium Niobate (LiNbO$_3$) using the proton exchange method and two optical or light modulators 16 and 17.

Light entered into the Y-branching optical waveguide 15 is branched into two light waves, namely, a first light wave and a second light wave, and the first light wave propagates and is incident on an fiber optic coil 20 via a fourth optical fiber 55 to propagate through the fiber optic coil 20 in the clockwise direction (hereinafter, referred to as CW direction). The second branched light wave propagates and is incident on the fiber optic coil 20 via a fifth optical fiber 56 to propagate through the fiber optic coil 20 in the counterclockwise direction (hereinafter, referred to as CCW direction).

In this embodiment, the fourth optical fiber 55 is formed by a polarization maintaining optical fiber having its length longer than 2L and the fifth optical fiber 56 is formed by a polarization maintaining optical fiber having its length, longer than 4L. These polarization maintaining optical fibers 55 and 56 are spliced in the axis rotation method to the two input/output ends of the optical integrated circuit 14 nearer the fiber optic coil (specifically, the input/output ends of the branched two optical waveguides of the Y-branching optical waveguide 15) with their inherent axes forming an angle of 45 degrees with those of the input/output ends, respectively. As a result, both the polarization maintaining optical fibers 55 and 56 function as depolarizers, respectively. The fiber optic coil 20 is formed by a single mode optical fiber.

The light wave propagating through the fiber optic coil 20 in the CW direction and the light wave propagating through the fiber optic coil 20 in the CCW direction are coupled to each other in the Y-branching optical waveguide 15 to interfere them with each other, and then the interference light is sent to a photodetector 25 through the fiber optic coupler 52. The photodetector 25 outputs an electric signal corresponding to an intensity of the interference light. The output signal from the photodetector 25 is supplied to a detection circuit 26 which, in turn, synchronously detects the electric signal outputted from the photodetector 25. A detection output that is outputted from the detection circuit 26 and corresponds to an inputted angular velocity is supplied to a feedback signal generator circuit 28 which, in turn, generates a feedback signal corresponding to the magnitude of the inputted detection output and an output signal of the fiber optic gyro (FOG) is obtained from this feedback signal.

Further, the connection between the Y-branching proton exchanged optical waveguide 15 of the optical integrated circuit 14 and the polarization maintaining optical fiber 54 of its length L are matched in their inherent axes such that the TM mode axis of the optical waveguide 15 and the slow axis (TM mode) of the polarization maintaining optical fiber 54 coincide with each other (that is, the slow axes of the optical waveguide 15 and of the polarization maintaining optical fiber 54 coincide with each other as well as the fast axes of the optical waveguide 15 and of the polarization maintaining optical fiber 54 coincide with each other).

Figure 3:
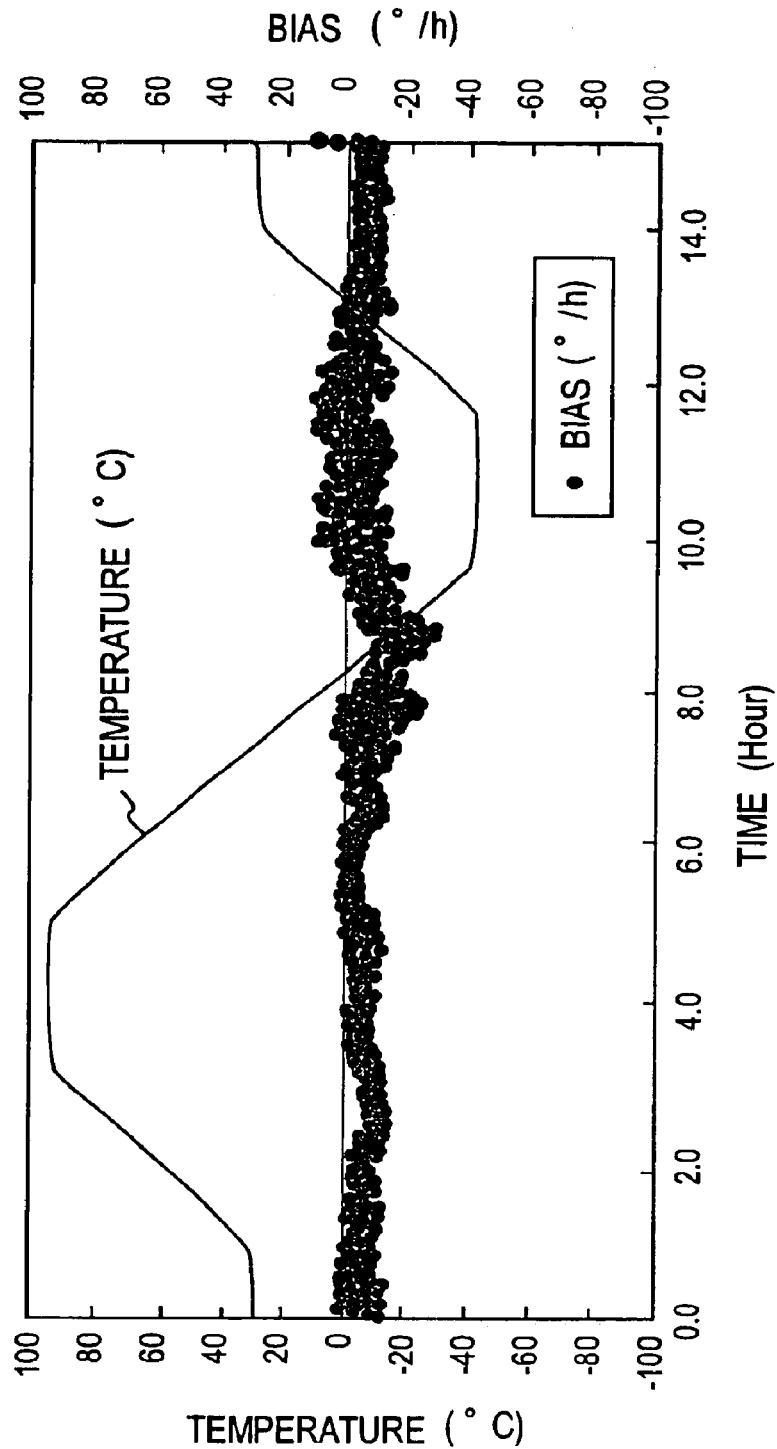
FIG. 3 is a graph showing the result of temperature test (variation of the bias to variation of temperature) for a fiber optic gyro in which an optical path from the light source to the optical integrated circuit as well as the fiber optic coupler are all formed by a polarization maintaining optical fiber.
Figure 5:
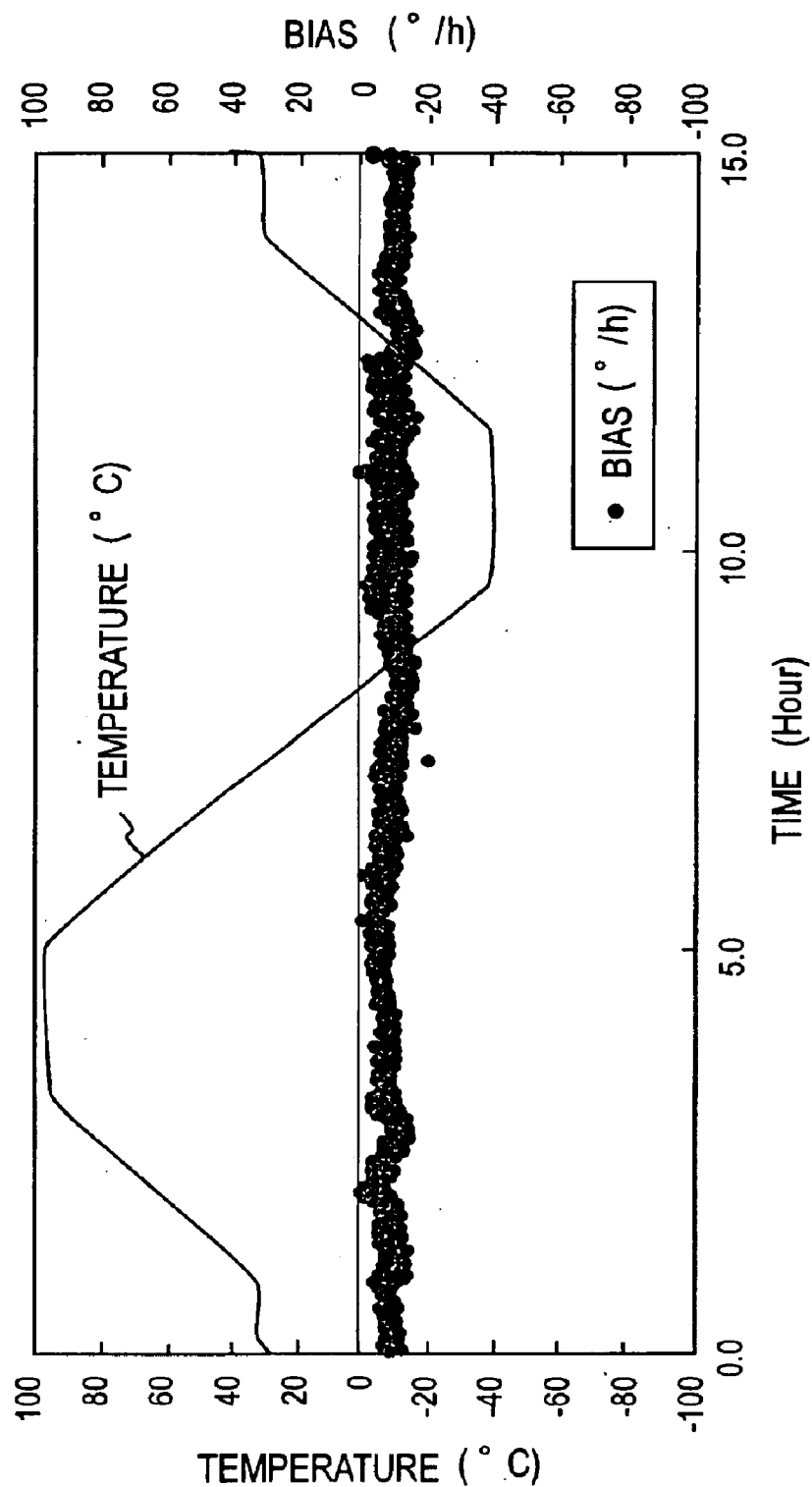
FIG. 5 is a graph showing the result of temperature test (variation of the bias to variation of temperature) for the fiber optic gyro having its construction shown in FIG. 4 according to the present invention.

FIG. 5 is a graph showing the result of temperature test (variation of the bias to variation of temperature) for the one embodiment of the fiber optic gyro according to the present invention constructed as described above. As can be easily understood from FIG. 5, it is found that the result of temperature test for the fiber optic gyro of the above embodiment is by no means inferior to the result of temperature test shown in FIG. 3 for the fiber optic gyro in which all of the optical path from the light source to the optical integrated circuit and the fiber optic coupler have been formed by a polarization maintaining optical fiber. In other words, it is understood that by merely connecting to the input/output end of the optical integrated circuit 14 nearer the light source the polarization maintaining optical fiber 54 having the unit length L that brings about a group delay time between the TM polarization mode and the TE polarization mode, the group delay time at least being longer than a coherent time of the light from the light source 10, even the remaining optical path from the light source 10 to the optical integrated circuit 14 as well as the fiber optic coupler 52 are formed entirely by a single mode optical fiber, an output bias due to re-coupling of a stray light can be suppressed.

Moreover, in the above embodiment, the optical path from the light source 10 to the optical integrated circuit 14 as well as the fiber optic coupler 52 consisting of a single mode optical fiber are formed entirely by a single mode optical fiber except for the polarization maintaining optical fiber 54 having its length L, and therefore, the production cost can be remarkably reduced down.

In addition, since the polarization maintaining optical fiber 55 having its length longer than 2L and the polarization maintaining optical fiber 56 having its length longer than 4L are connected to the corresponding ends of the fiber optic coil 20 consisting of a single mode optical fiber respectively, the effects of the group delays in the polarization maintaining optical fibers are not cancelled each other while light to be transmitted in the CW direction or in the CCW direction propagates through both of the polarization maintaining optical fibers, and further, since the polarization maintaining optical fiber 54 of its length L is connected to the input/output end of the optical integrated circuit 14 nearer the light source, while light propagating through in the CW direction or in the CCW direction and entering into the polarization maintaining optical fiber 54 propagates therethrough, the effects of the group delays are not offset. As a result, there can be realized the fiber optic gyro in which any bias is fully suppressed with regard to light propagating from the light source 10 to the fiber optic coil 20 through the fiber optic coupler 52 and the optical integrated circuit 14 as well as light propagating from the fiber optic coil 20 to the photodetector 25 through the optical integrated circuit 14 and the fiber optic coupler 52. Moreover, since this fiber optic gyro is constructed mainly by a single mode optical system, it can be inexpensively fabricated.

Figure 6:
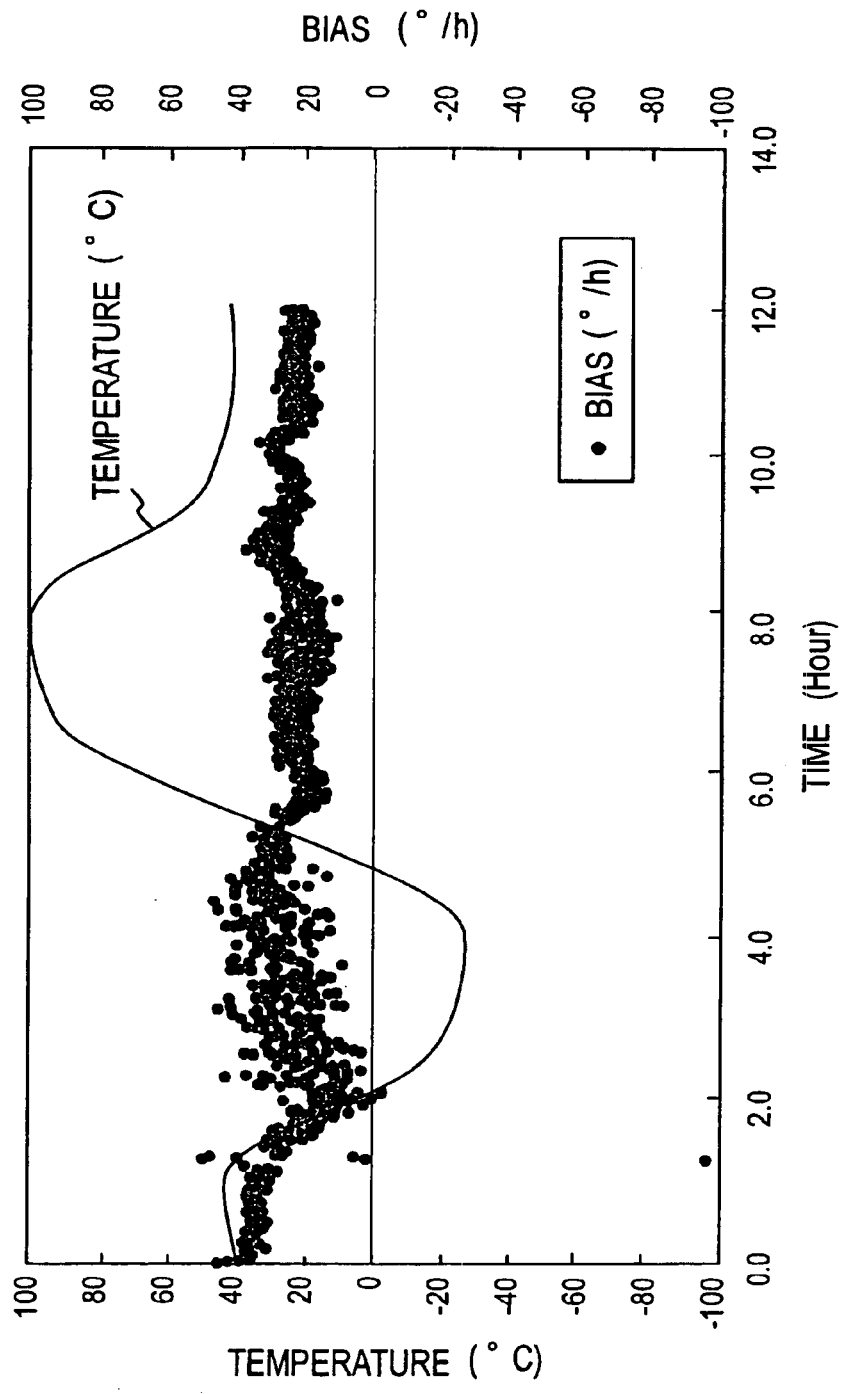
FIG. 6 is a graph showing the result of temperature test (variation of the bias to variation of temperature) for a fiber optic gyro in which an optical path from the light source to the optical integrated circuit as well as the fiber optic coupler are all formed by a single mode optical fiber except that a portion of the single mode optical fiber connected to the end of the integrated circuit nearer the light source is replaced by a polarization maintaining optical fiber of an insufficient length (about 20 cm).

FIG. 6 is a graph showing the result of temperature test (variation of the bias to variation of temperature) for a fiber optic gyro in which a polarization maintaining optical fiber of an insufficient length (about 20 cm) that brings about a group delay time between the TM polarization mode and the TE polarization mode, the group delay time not exceeding a coherent time of the light from the light source, is connected to the input/output end of the optical integrated circuit nearer the light source, and the remaining optical path from the light source to the optical integrated circuit as well as the fiber optic coupler are all formed by a single mode optical fiber. The construction of this fiber optic gyro is substantially the same as that of the fiber optic gyro shown in FIG. 4 except that the length of the polarization maintaining optical fiber 54 connected to the input/output end of the optical integrated circuit 14 nearer the light source is set to 20 cm or so.

It is understood from the graph shown in FIG. 6 that even a portion of the optical path from the light source to the optical integrated circuit is merely replaced by a polarization maintaining optical fiber, an output bias due to re-coupling of a stray light cannot be suppressed.

In the above embodiment, the case in which the present invention is applied to a closed loop type fiber optic gyro has been described. However, it is needless to say that the present invention can be equally applied to an open loop type fiber optic gyro and the same function and effects can be obtained. In addition, though the present invention can suitably be applied to a fiber optic gyro in which the fiber optic coil is constructed by a single mode optical fiber, it is a matter of course that the present invention can be also applied to a fiber optic gyro in which the fiber optic coil is not constructed by a single mode optical fiber.

Further, in the above embodiment, there is used an optical integrated circuit that is provided with Y-branching optical waveguide fabricated on an optical crystal substrate of Lithium Niobate ($LiNbO_3$) using the proton exchange method. The optical crystal substrate may be formed by Lithium Titanate ($LiTaO_3$). Alternatively, there may be used an optical integrated circuit in which any polarizer is assembled as a local device in a portion of an optical waveguide of Titanium diffused Lithium Niobate through which both the polarization modes can be transmitted, for example. In short, any optical integrated circuit having a function of a polarizer and a branching optical waveguide may be used.

As is apparent from the foregoing explanation, according to the present invention, since to the input/output end of the optical integrated circuit nearer the light source is connected the polarization maintaining optical fiber having the unit length L that brings about a group delay time between the TM polarization mode and the TE polarization mode, the group delay time at least exceeding a coherent time of light from the light source, there occurs no irregular re-coupling of a stray light to be extinguished in the optical integrated circuit, and any bias does not occur. Accordingly, it is possible to make the detection sensitivity of the fiber optic gyro higher. In addition, the optical path from the light source to the optical integrated circuit as well as the fiber optic coupler consisting of a single mode optical fiber are all constructed by a single mode optical fiber except for the polarization maintaining optical fiber having its length L, and hence the production cost can be markedly reduced down.

Furthermore, if a polarization maintaining optical fiber having its length longer than 2L and a polarization maintaining optical fiber having its length longer than 4L are connected to the corresponding ends of the fiber optic coil respectively, the fiber optic coil can be constructed by a single mode optical fiber, which results in further reduction of the production cost. In addition, while light propagates through each of the polarization maintaining optical fibers, the effects of the group delays are not offset. Therefore, it is possible to further improve the detection sensitivity of the fiber optic gyro.

While the present invention has been described with regard to the preferred embodiment shown by way of example, it will be apparent to those skilled in the art that various modifications, alterations, changes, and/or minor improvements of the embodiment described above can be made without departing from the spirit and the scope of the present invention. Accordingly, it should be understood that the present invention is not limited to the illustrated embodiment, and is intended to encompass all such modifications, alterations, changes, and/or minor improvements falling within the scope of the invention defined by the appended claims.

What is claimed is:

1. A fiber optic gyroscope in which light from a light source is entered through an optical fiber and a fiber optic coupler into a substrate type optical integrated circuit having a function of a polarizer and a branching optical waveguide, light waves branched in the optical integrated circuit are entered into both ends of a fiber optic coil as a clockwise light and a counterclockwise light respectively, the clockwise light and the counterclockwise light having propagated through the fiber optic coil are coupled to each other in the optical integrated circuit thereby to interfere both light waves with each other, the interference light is entered into a photodetector through the fiber optic coupler to convert the intensity thereof to an electric signal, and an angular velocity applied to the fiber optic coil about the axis thereof is detected from the electric signal, said fiber optic gyroscope comprising:

a polarization maintaining optical fiber having its length L connected to an input/output end of the optical integrated circuit nearer the light source in an optical system of optical fiber from the light source to the optical integrated circuit, said polarization maintaining optical fiber of its length L resulting in a difference in group delay time between the orthogonal two polarization modes and said difference at least exceeding a coherence length of light from the light source;

an optical system of optical fiber from the light source to the optical integrated circuit except for the polarization maintaining optical fiber of its length L, that is constructed by a single mode optical fiber; and the fiber optic coupler that is constructed by a single mode optical fiber.

2. The fiber optic gyroscope as set forth in claim 1, wherein the branching optical waveguide of the optical integrated circuit and the polarization maintaining optical fiber of its length L are connected with each other in the state that the branching optical waveguide and the polarization maintaining optical fiber of its length L are aligned with each other so that the TM mode axis of the branching optical waveguide coincides with the slow axis of the polarization maintaining optical fiber of its length L.

3. The fiber optic gyroscope as set forth in claim 1, wherein the fiber optic coil is constructed by a single mode optical fiber, a first and a second polarization maintaining optical fibers are connected to both ends of the coil respectively, the two polarization maintaining optical fibers are connected to the branching optical waveguide of the optical integrated circuit in the axis rotation method in the state that the polarization axis of each polarization maintaining optical fiber and the polarization axis of the corresponding branching optical waveguide are placed at an angle of 45 degrees, the first polarization maintaining optical fiber has its length at least longer than 2L, and the second polarization maintaining optical fiber has its length at least longer than 4L.

4. The fiber optic gyroscope as set forth in claim 2, wherein the fiber optic coil is constructed by a single mode optical fiber, a first and a second polarization maintaining optical fibers are connected to both ends of the coil respectively, the two polarization maintaining optical fibers are connected to the branching optical waveguide of the optical integrated circuit in the axis rotation method in the state that the polarization axis of each polarization maintaining optical fiber and the polarization axis of the corresponding branching optical waveguide are placed at an angle of 45 degrees, the first polarization maintaining optical fiber has its length at least longer than 2L, and the second polarization maintaining optical fiber has its length at least longer than 4L.

* * * * *